March 4, 1958 C. B. DOTY 2,825,601
VISOR FOR VEHICLE BODY
Original Filed April 10, 1952
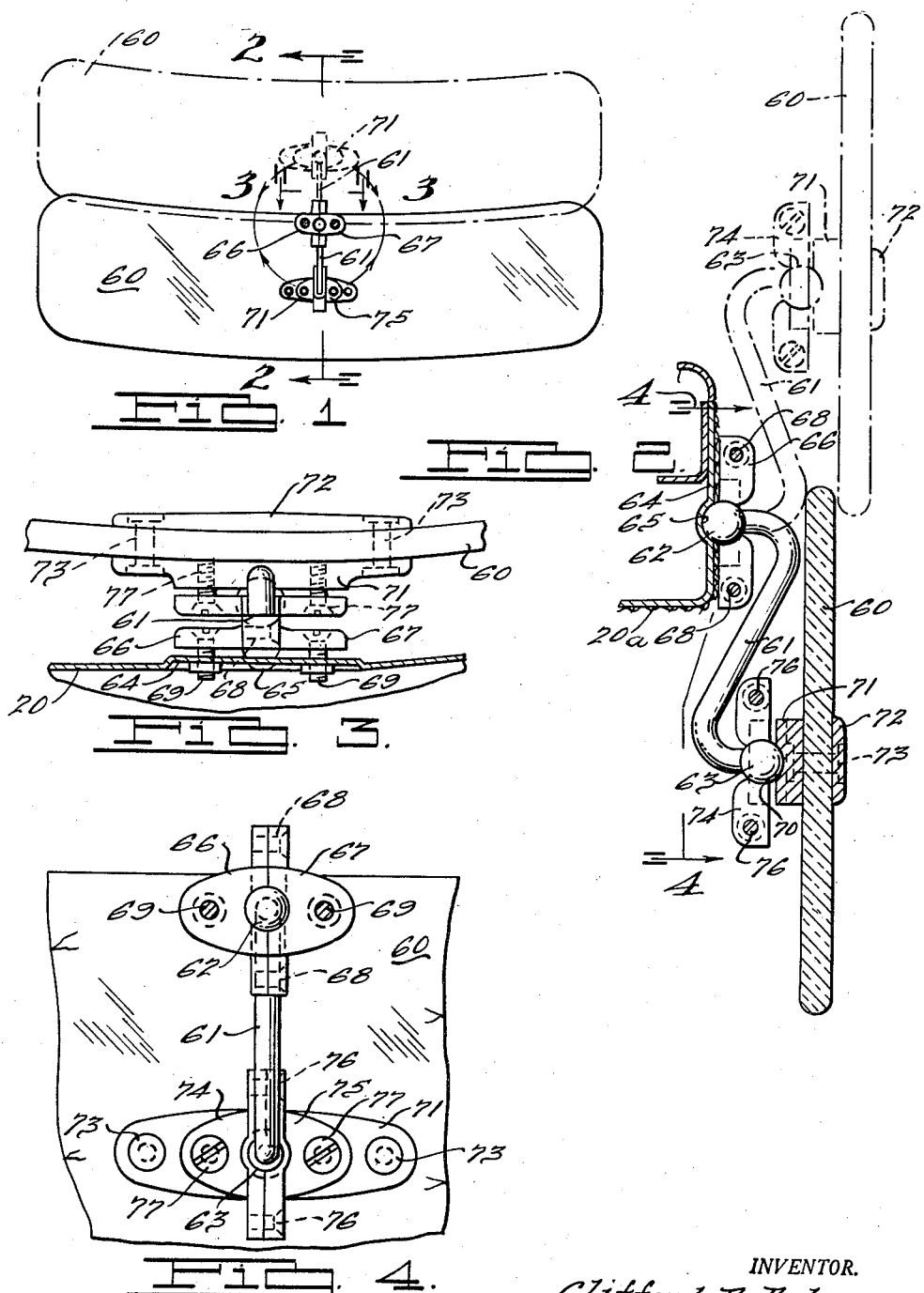
INVENTOR.
Clifford B. Doty.
BY
Elmer Jamison Gray
ATTORNEY.

United States Patent Office 2,825,601
Patented Mar. 4, 1958

2,825,601

VISOR FOR VEHICLE BODY

Clifford B. Doty, Detroit, Mich., assignor, by mesne assignments, to Chrysler Corporation, a corporation of Delaware Continuation of application Serial No. 281,556, April 10, 1952. This application June 1, 1953, Serial No. 358,904

2 Claims. (Cl. 296—97)

This invention relates to a sun visor or glare shield for the interior of an automobile body and in particular to such a visor adapted especially for use with a convertible type vehicle body having a forwardly bowed or curved front header bar above a correspondingly curved windshield. This application is a continuation of my copending application Serial No. 281,556, filed April 10, 1952, now abandoned.

An object of the invention is to provide an improved glare shield and mounting therefor comprising a generally rectangular blade or plate type visor adapted to extend transversely of the vehicle body at shading positions rearward of the windshield and being curved to conform substantially to the contour of the header bar and windshield, the visor being supported by a double pivotal construction comprising a vertically swinging arm or visor support pivotally connected at a confined end to the header bar and at a swinging end to the visor, whereby the visor may be swung bodily to raised or lowered shading positions above or below the header bar respectively and held in such positions in generally parallel relationship to the header bar and windshield. The visor is maintained at any adjusted position by frictional means embodied in the pivotal connections at the ends of the swinging support.

By virtue of the improved construction the curved visor is enabled to nest closely to the curved header bar as well as to the curved windshield when the visor is disposed in either its lowered or raised position. When the top is in unfolded or open position the visor can be raised so as to nest closely to the folding top header within the curvature thereof and out of the way. When the top is folded or closed and the visor is in the raised position above the header bar, the visor's usefulness as a sun shield is extended to shade the driver or front seat passenger when the sun is at a high angle of elevation. At low angles of the sun, the visor is advantageously employed in the lowered position. As a result, a sun shield of materially improved efficiency is provided which is useful throughout a large range of angular positions of the sun.

Another object of the invention is to provide a glare shield and mounting therefor of the foregoing character wherein the swinging arm or visor support is pivotally connected to the header bar and visor for swinging about generally parallel axes extending generally horizontally and longitudinally of the vehicle body, so that the visor is maintained closely to the windshield and header bar upon being swung to the raised and lowered positions.

Still other objects are to provide an improved sturdy mounting for the visor wherein the latter is adequately supported between front and rear clamping or bracket members adjacent its front and rear sides, the front bracket member being cooperable with the swinging end of the visor support and secured thereto for pivotal movement whereby angular adjustment of the visor and its nesting relationship within the curvature of the header bar is permitted.

Other objects of this invention will appear in the following description and appended claims, reference being had to the accompanying drawings forming a part of this specification wherein like reference characters designate corresponding parts in the several views.

Fig. 1 illustrates a visor embodying the present invention.

Fig. 2 is an enlarged vertical section taken in the direction of the arrows along the line 2—2 of Fig. 1.

Fig. 3 is an enlarged section taken in the direction of the arrows along the line 3—3 of Fig. 1.

Fig. 4 is a section taken in the direction of the arrows substantially along the broken line 4—4 of Fig. 2.

It is to be understood that the invention is not limited in its application to the details of construction and arrangement of parts illustrated in the accompanying drawings, since the invention is capable of other embodiments and of being practiced or carried out in various ways. Also is is to be understood that the phraseology or terminology employed herein is for the purpose of description and not of limitation.

An embodiment of the present invention is illustrated, by way of example, which is particularly adapted for use with a convertible type vehicle body having a forwardly bowed header or header bar 20 above a correspondingly curved windshield. The header 20 is of usual hollow sheet metal construction covered at its rear wall with a suitable decorative trim 20a, Fig. 2, and is adapted to receive and support an overlying top header of a conventional folding top (not shown) when the latter is unfolded.

A visor blade 60 of generally rectangular shape is provided to extend transversely of the body inside and adjacent the windshield and is curved to conform to the corresponding curvature of the windshield and windshield header 20. Preferably a pair of similar visors are employed, one at each side of the vehicle. Since the arrangement and mounting are the same for each visor, only the right hand visor 60 is shown. The visor may be of any suitable material, and may be opaque or translucent. A tinted transparent plastic visor which reduces glare without entirely obstructing vision may be used.

The visor 60 is adjustably supported by a vertically swinging S-shaped arm or support 61 having approximately parallel oppositely directed end portions terminating in balls 62 and 63. The axis of extension of one end of the arm 61 extends generally forward toward a rearwardly offset flattened portion 64 of the rear wall of the header 20 and through the center of the ball 62, Figs. 3 and 4, which is pivotally seated in a spherical depression or socket 65 in the offset portion 64 and is maintained in the seated position by a pair of mating ball retainers 66 and 67. The latter engage the ball 62 at opposite sides thereof, Fig. 4, and are secured together by a pair of screws 68. The retainers 66 and 67 are also provided with confronting spherical socket portions cooperable to enclose zonal portions of the ball 62 both forward and rearward of its center, Fig. 2, so that the connected retainers 66 and 67 are rotatably confined on the ball 62. The forward faces of the retainers 66 and 67 are slightly spaced from the header portion 64 and are drawn toward the latter by a pair of screws 69, which are secured by nuts adjacent the forward side of the header portion 64, Fig. 3.

The axis of extension of the other end of the support 61 passes centrally through the ball 63, which is seated in a forwardly opening spherical socket 70 of a support or clamping member 71. The latter confronts the forward face of the visor 60 centrally and is opposed by a rear clamping plate 72 confronting the rear face of the visor 60. A pair of screws or rivets 73 extending through the visor connect the members 71 and 72 and hold the same snugly against the opposed sides of the visor 60 in a clamping action.

Serving similarly to the retainers 66 and 67, a pair of ball retainers 74 and 75 engage the ball 63 at opposite sides and are secured together by a pair of screws 76. The retainers 74 and 75 are provided with confronting spherical socket portions cooperable to enclose zonal portions of the ball 63 both forward and rearward of its center, Fig. 2, so that the connected retainers 74 and 75 are rotatably confined on the ball 63. The rearward faces of the retainers 74 and 75 confronting the clamp 71 are slightly spaced therefrom and are drawn toward the latter by a pair of screws 77. Upon suitably tightening the screws 69 and 77, the balls 62 and 63 are frictionally bound between the corresponding socket portions within which they are seated, so as to hold the visor 60 and support 61 at any adjusted position, but to permit the same to be freely adjusted by manual pressure applied to the visor 60.

In the illustrated embodiment the visor 60 is serviceable as a sun shade either below or above the header bar, but is swung between the lowered and raised positions about the generally horizontal and forwardly extending axis of the pivotally confined end of the support 61, as indicated by the dotted circular path of movement in Fig. 1. Similarly the visor 60 is rotatable about a parallel axis at the swinging end of the arm 61, so that the nesting relationship between the curved visor 60 and header bar or windshield is maintained at any adjusted position, including positions intermediate the lowered and raised positions. Also by the illustrated structure limited lateral adjustment of the visor position is afforded as the visor is swung vertically. In addition, the ball and socket articulations permit limited universal adjustment at both ends of the arm 61, so that swinging of the visor is not confined to a single vertical plane. A visor of unusual adjustability and adaptability to various positions of the sun is thus provided.

I claim:

1. In an interior sun shield for one side of a convertible type vehicle body having a forwardly bowed front header, a visor adapted to extend transversely of the body and being curved to conform substantially to the curvature of said header, a generally S-shaped visor support having generally parallel oppositely directed end portions terminating in enlarged ball portions, a rearwardly opening socket in the rear wall of said header, one of said end portions extending generally forward and having its ball portion seated in said socket portion, a pair of separable ball retaining members spaced from said header and having confronting socket portions cooperable to engage said one ball portion in seated relation in opposition to said rearwardly opening socket portion, screw means securing said retaining members together, screw means for drawing said retaining members toward the header for frictionally binding the seated ball portion, forward and rearward clamping members disposed adjacent the front and rear faces respectively of the visor with the latter clamped therebetween, connecting means extending through the visor and engaging said clamping members to draw the same tightly toward each other, a forwardly opening socket portion in the forward clamping member and having the ball portion of the other end portion seated therein, a second pair of separable ball retaining members spaced from the forward clamping member and having confronting socket portions cooperable to engage said last named ball portion in seated relation in opposition to said forwardly opening socket portion, screw means securing the second retaining members together, and screw means for drawing said second retaining members toward said forward clamping member for frictionally binding the seated ball portion.

2. In an interior sun shield for one side of a convertible type vehicle body having a forwardly bowed front header, a visor adapted to extend transversely of the body at a shading position rearward of the windshield and being curved to conform substantially to the curvature of the latter, a vertically swinging visor support having a generally forward extension at one end terminating in a ball portion, a rearwardly opening socket portion in the rear wall of said header bar and having said ball portion seated therein, a pair of separable ball retaining members spaced from the header bar and having confronting socket portions cooperable to engage said ball portion in seated relation in opposition to said rearwardly opening socket portion, means securing said retaining members together, screw means for drawing said retaining members toward the header bar for frictionally binding the seated ball portion between the opposed socket portions, the support being thereby pivotal generally about the longitudinal axis of said extension from the shading position to a raised position, and means pivotally connecting the other end of said support to the visor.

References Cited in the file of this patent

UNITED STATES PATENTS

| 1,260,181 | Garnero | Mar. 19, 1918 |
| 1,391,915 | Starr et al. | Sept. 27, 1921 |
| 1,469,102 | Olcott | Sept. 25, 1923 |
| 1,518,956 | Beitman | Dec. 9, 1924 |
| 1,571,097 | Redman | Jan. 26, 1926 |
| 1,780,400 | Nelson | Nov. 4, 1930 |
| 1,868,031 | Sudbrink | July 19, 1932 |
| 2,556,950 | Walker | June 12, 1951 |

FOREIGN PATENTS

| 603,680 | France | Jan. 12, 1926 |
| 715,842 | France | Sept. 29, 1931 |
| 402,700 | Great Britain | Dec. 7, 1933 |